US006396577B1

(12) United States Patent
Ramstack

(10) Patent No.: US 6,396,577 B1
(45) Date of Patent: May 28, 2002

(54) LIDAR-BASED AIR DEFENSE SYSTEM

(76) Inventor: Thomas P. Ramstack, 816 Easley St. #407, Silver Spring, MD (US) 20910

( * ) Notice: Subject to any disclaimer, the term of this patent is extended or adjusted under 35 U.S.C. 154(b) by 0 days.

(21) Appl. No.: 09/812,451

(22) Filed: Mar. 19, 2001

(51) Int. Cl.[7] .......................... G01B 11/26; G01C 1/00; G01C 21/02
(52) U.S. Cl. .............................. 356/141.1; 250/203.2; 250/206.2
(58) Field of Search .................... 356/141.1; 250/203.2, 250/206.2

(56) References Cited

U.S. PATENT DOCUMENTS

| 3,427,611 | A | * | 2/1969 | Enenstein |
| 3,731,103 | A | * | 5/1973 | O'Meara |
| 3,946,233 | A | * | 3/1976 | Erben et al. |
| 3,953,131 | A | * | 4/1976 | Britz |
| 4,674,874 | A | * | 6/1987 | Halldorsson et al. |
| 4,682,024 | A | * | 7/1987 | Halldorsson et al. |
| 5,047,776 | A | * | 9/1991 | Baller |
| 5,600,434 | A | * | 2/1997 | Warm et al. |
| 5,847,815 | A | | 12/1998 | Albouy et al. |
| 5,883,706 | A | | 3/1999 | Basu |
| 5,914,776 | A | | 6/1999 | Streicher |
| 6,055,042 | A | | 4/2000 | Sarangapani |
| 6,111,241 | A | | 8/2000 | English et al. |
| 6,147,747 | A | | 11/2000 | Kavaya et al. |

FOREIGN PATENT DOCUMENTS

FR    2689252    * 10/1993

OTHER PUBLICATIONS

World Wide Web page entitled "What is Coherent Lidar" as found at http://www.ghcc.msfc.nasa.gov/sparcle/what_lidar.html. Dated Nov. 30, 2000.
World Wide Web page entitled "Atmospheric Lidar Division Research Area: Water Vapor Profiling" as found at http://www.2.etl.noaa.gov/DIAL.html. Dated Dec. 16, 2000.
World Wide Web page entitled "Atmospheric Lidar Division, Lidar Primer" as found at http://www2.etl.noaa.gov/DIAL_lidar.html. Dated Dec. 16, 2000.
World Wide Web page entitled "Mars Polar Lander, How Lidar Works" as found at http://marslander.jpl.nasa.gov/lidar/lidar_instrument.html. Dated Dec. 16, 2000.
World Wide Web page entitled "Mars Polar Lander, The Lidar's Science Goals" as found at http://marslander.jpl.nasa.gov/lidar/lidar_found.html. Dated Dec. 16, 2000.
World Wide Web page entitled "Mars Polar Lidar, Lidar Findings" as found at http://marslander.jpl.nasa.gov/lidar/lidar_found.html. Dated Dec. 16, 2000.
World Wide Web page entitled "VCL: The Vegetation Canopy Lidar Mission" as found at http://essp.gsfc.nasa.gov/vcl/. Dated Dec. 16, 2000.
World Wide Web page entitled "Lidar Tutorial" as found at http://www.ghcc.msfc.nasa.gov/sparcle/sparcle tutorial.html. Dated Nov. 30, 2000.
World Wide Web page entitled "Multi–Center Airborne Coherent Atmospheric Wind Sensor" as found at http://wwwghcc.msfc.nasa.gov/macaws/. Dated Nov. 30, 2000.
World Wide Web page entitled "Some Keywords and Concepts" as found at http://wwwghcc.msfc.nasa.gov/macaws/keywords.html. Dated Nov. 30, 2000.

* cited by examiner

Primary Examiner—Stephen C. Buczinski

(57) ABSTRACT

A lidar-based air defense system for providing a single unified system that may detect, track and even destroy airborne objects, even objects designed to move relatively undetected through conventional radar systems. The lidar-based air defense system includes a support, and a plurality of laser transmitters mounted on the support in sets of different angles. Each of the laser transmitters are adapted to transmit a coherent beam of light along an axis, with the plurality of laser transmitters being oriented such that the axes of the beams of light emitted from the laser transmitters radiate outwardly from the support to generate a grid of laser beams in the atmosphere. The system also includes a plurality of laser receivers and a processor for processing information from the laser transmitters and laser receivers.

19 Claims, 6 Drawing Sheets

LIDAR-BASED AIR DEFENSE SYSTEM

BACKGROUND OF THE INVENTION

1. Field of the Invention

The present invention relates to air defense systems, and more particularly pertains to a single unified system that may detect, track and even destroy airborne objects, even objects designed to move relatively undetected through conventional radar systems.

2. Description of the Prior Art

Radar systems using radio frequency waves are well known for detecting and tracking objects in the atmosphere of the Earth for the purpose of air defense. Such systems are used for guiding manned aircraft and unmanned weapon systems to the objects, and for destruction of the objects, if necessary. Thus, the conventional air defense systems have typically employed one system for detecting and tracking objects in the atmosphere, and a relatively separate system for destroying, or otherwise rendering ineffective, objects representing a threat to the protected ground area below the area of atmosphere being patrolled.

Technology has been developed that employs relatively higher frequency, shorter wavelength waves in the ultraviolet, visible, and infrared region of the electromagnetic spectrum are sometimes referred to as "lidar" systems, which stands for "LIght Detection And Ranging" or "Laser Infrared raDAR", depending upon the particular source consulted. The lidar systems transmit and receive relatively short frequency electromagnetic radiation.

The basic instruments of a lidar system are a transmitter, a receiver, and a detector. A lidar system's transmitter is typically a laser-generating apparatus, while the receiver typically includes optical equipment, in contrast to the radio wave transmitters and receivers of radar systems. Different types of lasers can be employed for the transmitter, depending upon the power and wavelength of the electromagnetic wave employed in the lidar system. Laser emissions are produced when high-voltage electricity causes a quartz flash tube to emit an intense burst of light, exciting some of the atoms in a ruby crystal to higher energy levels. At a specific energy level, some atoms emit particles of light called photons. At first, the photons are emitted in all directions. Photons from one atom stimulate emission of photons from other atoms and the light intensity is rapidly amplified. Mirrors at each end reflect the photons back and forth, continuing this process of stimulated emission and amplification. The photons leave through the partially silvered mirror at one end, and these photons comprise the laser light emission. An important fact to note is that the photons are energy. Therefore, when two laser beams are crossed, most of the photons will pass through the intersecting beam and continue on the same course as before they crossed.

The receiver of a lidar system detects the light waves scattered back to the receiver by objects in the path of the photons of the laser emission from the laser of the transmitter. The receiver records the scattered light received by the receiver at fixed time intervals. Lidar systems typically use sensitive detectors called photomultiplier tubes to detect the back-scattered light waves. The photomultiplier tubes initially convert the individual quanta of light, or photons, received by the receiver into electric currents, and then convert the electrical currents into digital photocounts that can be stored and processed on a computer. The electric currents generated by the receivers are normally in the range of picoamps.

The photocounts received by the receiver can be recorded for fixed time intervals during the return pulse of photons. The times can be converted to vertical heights above the ground, referred to as range bins, because the speed of light is a known constant. A range bin can be determined from a return pulse time. Range-gated photocounts (e.g., those photocounts that lie within a small range interval) can be stored and analyzed by a computer.

So far, the primary uses of lidar systems have been for detection of weather phenomena and pollutants in the atmosphere. The National Aeronautics and Space Administration (NASA) has also used a lidar system to map the topography of Mars. The military applications of lidar systems have included using them as range-finders to determine the distance to a target, and for missile defense. In a test in June 2000, the U.S. Air Force trained a high energy lidar laser on a missile for several seconds while tracking it with radar, and destroyed it in mid-air.

The four basic types of lidar systems are used primarily to measure pollutants in the air and to measure wind conditions. The types of lidar systems are similar in that all of the systems use lasers for transmitters and telescopes for receivers. However, each type of lidar system employs a different kind of light scattering.

One type of lidar system, the DIAL system, which stands for DIfferential Absorption Lidar, aims a laser at high and low regions of the atmosphere to measure the amount of ozone. Because light is absorbed at different wavelengths at different altitudes, a measurement of the difference in absorption of light can determine the amount of ozone present.

Another type of lidar system, the LITE system, which stands for LIdar Technology Experiment, is used to detect clouds and aerosols from space. It was used for the first time on NASA shuttle mission STS-64 in September 1994. The LITE system uses elastic scattering of light to measure aerosol particles in clouds. Elastic scattering means that the scattered light waves are at the same frequency as the incident light waves from the laser of the transmitter.

Yet another lidar system, the GALE system, which stands for Giant Aperture Lidar Experiment, measures wind, temperature and ocean waves using resonance fluorescence scattering. When sodium atoms in the atmosphere are illuminated by lidar laser emitted light waves at a precise wavelength, the sodium atoms radiate light waves that are measurable by receivers. By slightly changing the wavelength of the transmitted light, the shift of the spectral line from its central wavelength can be measured. The shift of the central wavelength is known as the Doppler shift. The Doppler shift can be used to measure wind speeds and currents that could be important for airplanes trying to avoid turbulent winds.

Still another lidar system, the PCL, or Purple Crow Lidar, system measures temperature, waves and water vapor. The PCL system measures temperature with the same kind of sodium resonance-fluorescence scattering as in the GALE system. It also uses Rayleigh scattering from air molecules to measure temperature. Rayleigh scattering refers to the fact that different kinds of light scatter more strongly than others do. Blue light, for example, scatters five times more strongly than red light. The amount and color of the scattering depends on the kinds of molecules the light strikes. Oxygen, for example, produces significant scattering of blue light, which explains the blue sky of Earth's atmosphere. The PCL system employs a receiver called a liquid mirror telescope. The liquid mirror telescope contains mercury or gallium that is spun to achieve a parabolic surface that can be used for lidar light wave measurement.

One prior use of lidar systems was NASA's Multi-center Airborne Coherent Atmospheric Wind Sensor (MACAWS). MACAWS is an experimental design that uses an airborne, pulsed, scanning, coherent Doppler lidar that remotely senses the distribution of wind velocity and aerosol backscatter within three-dimensional volumes in the troposphere and lower stratosphere. The MACAWS components included a frequency stable, pulsed, transverse-excited, atmospheric pressure (TEA) CO2 laser transmitter producing 0.6–1.0 Joules per pulse between 9 to 11 microns (nominally 10.6 microns and 0.7 J) at a pulse repetition frequency (PRF) of 1 to 30 Hz (nominally 20 Hz); a coherent receiver employing a cryogenically-cooled HgCdTe infrared detector; a 0.3 m off-axis paraboloidal telescope shared by the transmitter and receiver in a monostatic configuration, a ruggedized optical table and support structure, a scanner, a data processing means, a real-time display, a storage device, and an Operations Control System (OCS) to orchestrate the operation of all components.

In the MACAWS experiment, five DC-8 airplanes were used simultaneously, each carrying a separate lidar system. Each lidar system was aimed through a window of the aircraft and created a scan plane that intersected with the scan planes of the other aircraft. The crossing of the laser emissions of the transmitters did not significantly deflect the trajectory of the photons of the laser emissions. Instead, the photons, which are energy, passed through each other and continued in straight lines. The goal of the experiment was to create holographic images of atmospheric conditions.

The first trial measurements were made Sep. 13–26, 1995 over the western United States and eastern Pacific Ocean. On May 24, 1996, another MACAWS flight measured wind speeds over central California. From Aug. 10–Sep. 22, 1998, MACAWS flights were used to obtain holographic data—such as the velocity gradients and eyewall curvature—on hurricanes Bonnie, Danielle, Earl, and George in the Atlantic Ocean.

The military usages of both lidar systems and lasers have included range finding. As range finders, the U.S. Army has used lidar systems on battlefields to determine the distance to a target, such as an enemy tank. In a range finder application, a laser transmits a pulse while a receiver (often little more than a lens) registers a pulse when back-scattered light is picked up by the receiver. A computer portion of the system measures the time interval between the time when the laser pulse is emitted and the reflected pulse is sensed. Because the speed of light is known, a measurement of the round-trip distance between the laser pulse and the receiver indicates distance to target.

More sophisticated lidar systems operate on substantially the same principle as the range finder. By adding multiple receivers at different locations and triangulating the results, the target can be accurately located in three dimensions, or holographically.

Alternatively, by adding a scan mirror to the laser transmitter, the beam can be directed to various parts of the target. By determining the small differences in distance to the target, the surface contours can be determined. Currently, this technique is used to look at the gross features of large objects. Similar information can be determined by replacing the receiver with an array of detectors.

NASA has employed technology similar to the range finder lidar system to map the topography of Mars using an orbiting satellite. The satellite directed a laser at the surface of Mars. Depending on the length of time it took for each pulse to create backscattered light, the lidar system could determine the heights of mountains, depth of valleys and other surface features of the planet.

Most of the other military applications of lasers involve shooting down missiles. An example occurred during a Jun. 7, 2000 test at White Sands Missile Range, N.M., in which the U.S. Army used its Tactical High Energy Laser/ Advanced Concept Technology Demonstrator (THEL/ ACTD) to shoot down a rocket carrying a live warhead. The test demonstrated the first high-energy laser weapon system designed for operational use. After the rocket was launched, a fire control radar detected the rocket, tracked it with its high-precision pointer tracker system, and then engaged the rocket with its high-energy chemical laser. After several seconds of having the laser beam directed on the warhead, the rocket exploded in mid-air. Although the system was originally designed as a stationary device, its primary subsystems have been packaged in transportable, semi-trailer-sized shipping containers, allowing it to be deployed to other operational locations.

The U.S. Army and Air Force also have been testing a similar airborne system. The lasers would be carried by airplanes that would direct the beams at incoming missiles to destroy them, similar to the Jun. 7, 2000 test at White Sands Missile Range.

The present invention substantially departs from the conventional concepts and designs of the prior art, and in so doing provides an apparatus primarily developed for the purpose of providing a single unified system that may detect, track and even destroy airborne objects, even objects designed to move relatively undetected through conventional radar systems.

SUMMARY OF THE INVENTION

In view of the foregoing limited uses of lidars present in the known and prior art, the present invention provides a new apparatus and method for detecting, tracking, and destroying airborne craft, especially stealth-type aircraft designed to avoid detection by conventional radar, missiles and laser-guided bombs and missiles. It should be noted that none of the aforementioned DIAL, LITE, GALE, and PCL lidar systems has been used for military applications such as detecting and/or destroying aircraft, laser-guided "smart" bombs or missiles. In addition, all of the aforementioned systems use relatively low-energy lasers. The known systems could not be used to destroy or knock incoming aircraft, bombs or missiles off target. Finally, all of the lidar systems used for weather and atmospheric measurement have used no more than five laser transmitters at one time, and those transmitters were positioned at widely separated locations and aimed generally toward the other transmitters.

The general purpose of the present invention, which will be described subsequently in greater detail, is to diminish the risk of military or terrorist attacks that could be accomplished through stealth aircraft, missiles and laser-guided bombs and missiles.

To attain this, the present invention generally comprises a support, and a plurality of laser transmitters mounted on the support. Each of the laser transmitters are adapted to transmit a coherent beam of light along an axis, with the plurality of laser transmitters being oriented such that the axes of the beams of light emitted from the laser transmitters radiate outwardly from the support in sets of different angles to generate a grid of laser beams in the atmosphere. The system also includes a plurality of laser receivers and a processor for processing information from the laser transmitters and laser receivers.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
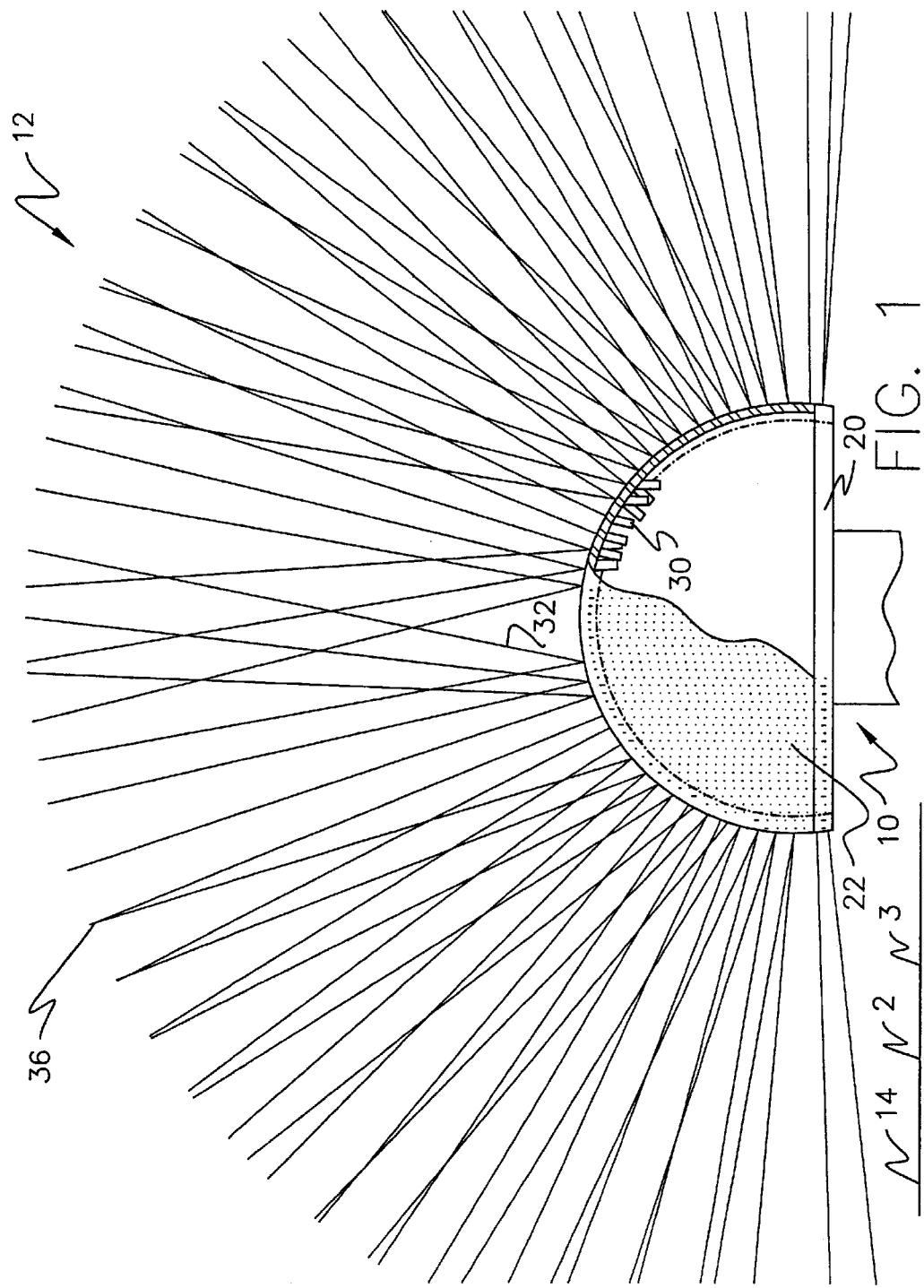
FIG. 1 is a schematic side view of a new system according to the present invention with the laser emissions being represented by lines radiating outwardly from the system.
Figure 2:
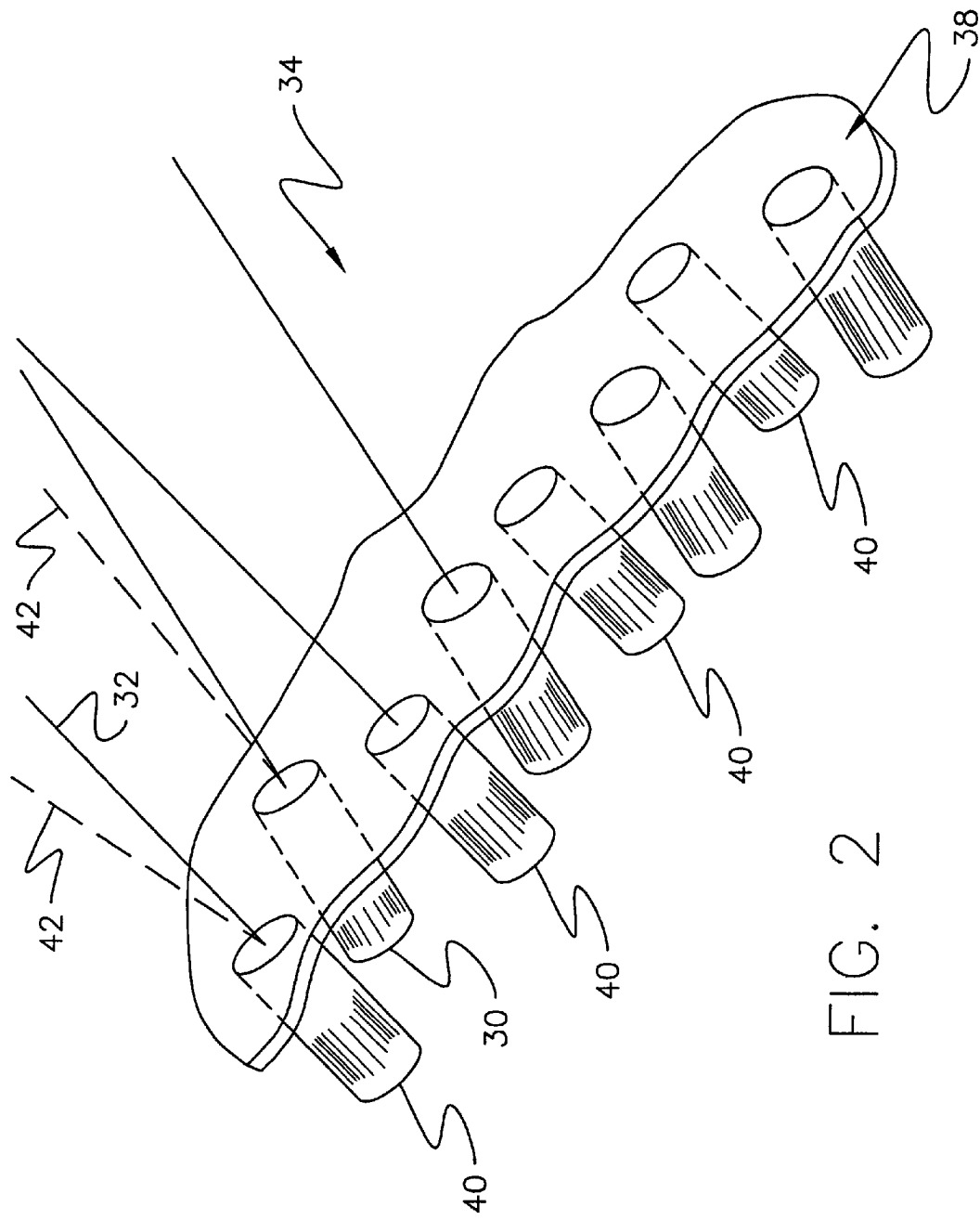
FIG. 2 is a schematic perspective view of a portion of the laser transmitters of the invention.
Figure 3:
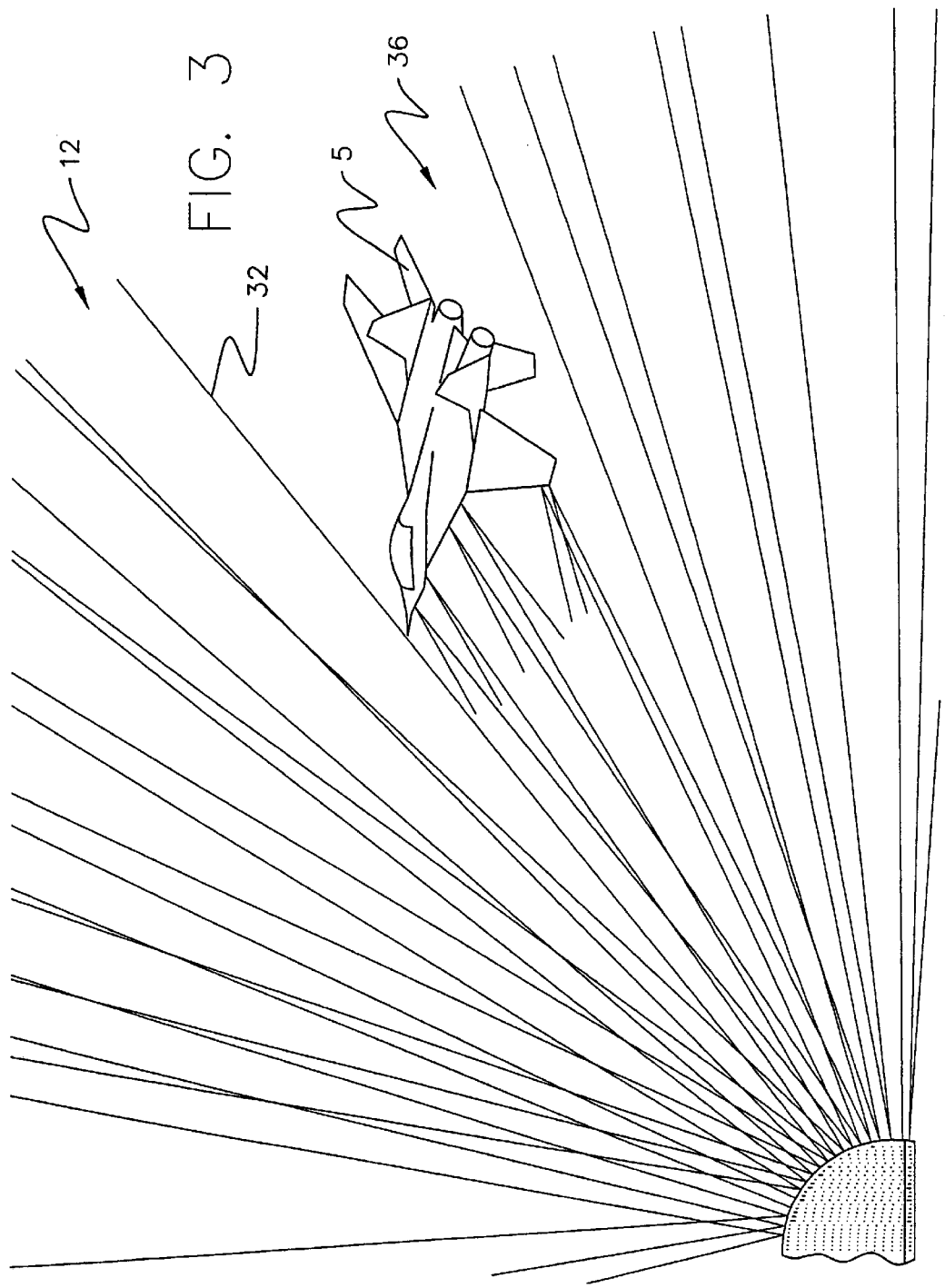
FIG. 3 is a schematic depiction of an airborne object moving through the zone of laser emissions created by the present invention, and causing backscattering of the laser emissions.
Figure 4:
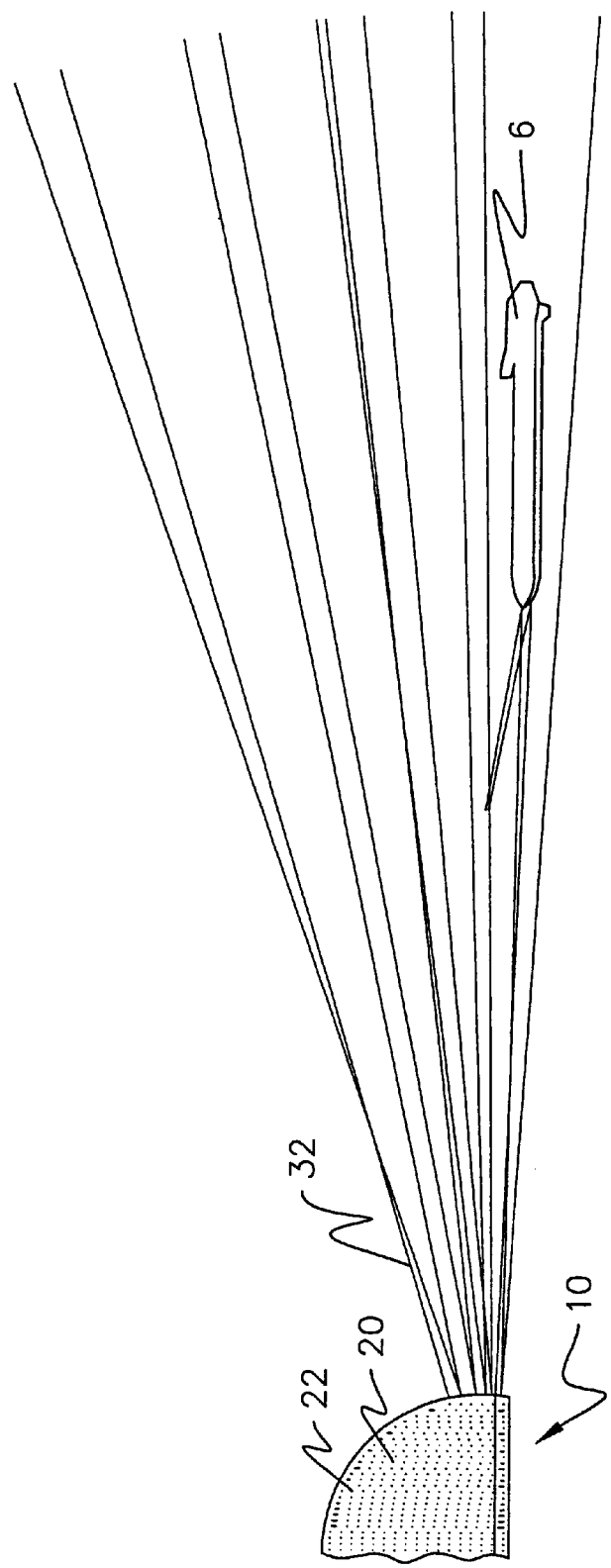
FIG. 4 is a schematic depiction of an airborne object approaching the system at a vertical level relatively below the plane of the horizon.
Figure 5:
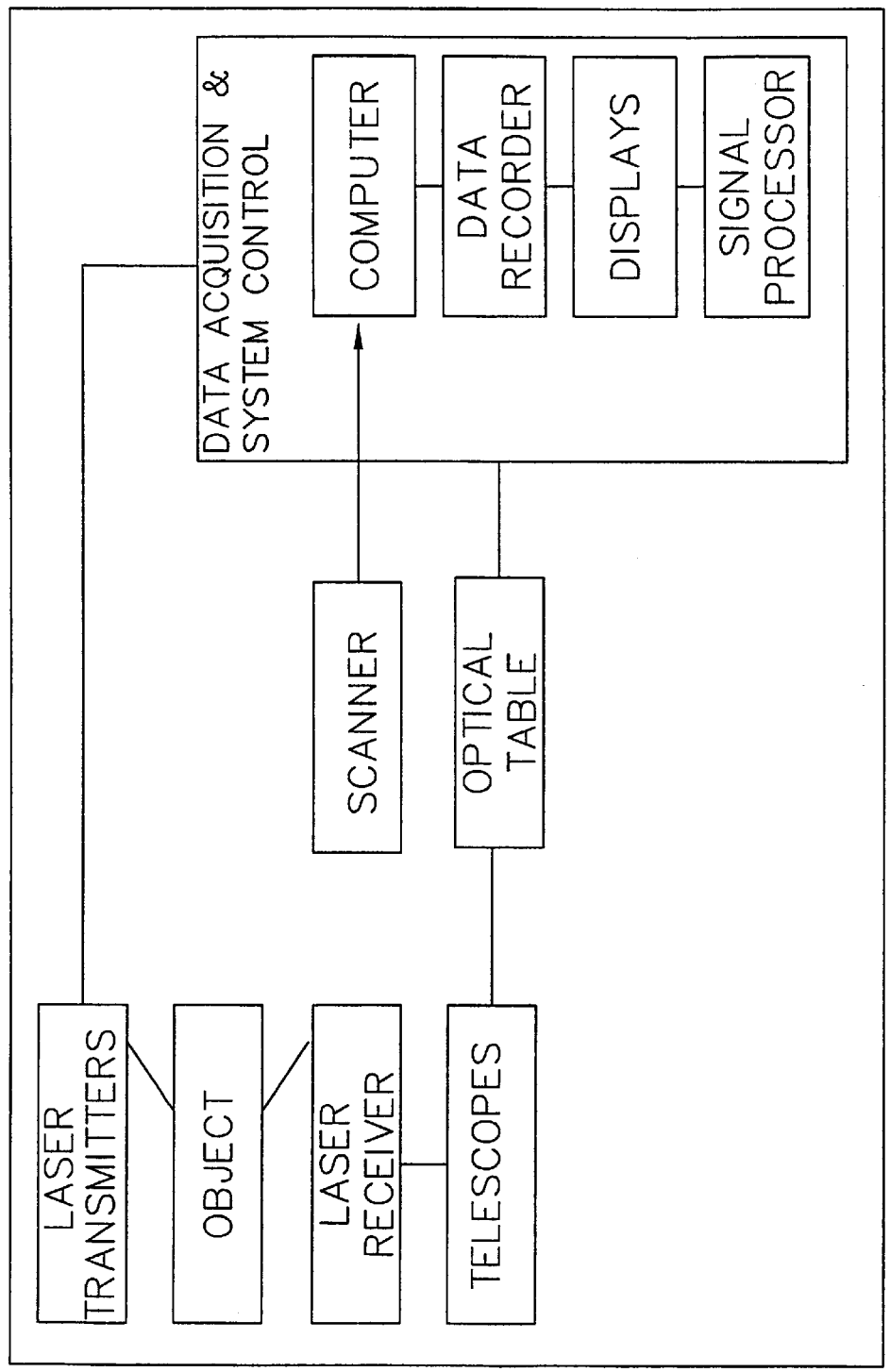
FIG. 5 is a schematic diagram of the relationship of portions of the system of the invention.

With reference now to the drawings, and in particular to FIGS. 1 through 6 thereof, a new lidar-based air defense system embodying the principles and concepts of the present invention will be described.

The invention contemplates a system 10 employing lidar technology to create a hemispherical zone about a location on, or slightly above, the surface 2 of the Earth, whether comprising land 3 or a body 4 of water or a combination of both. In this zone 12 created by the system of the invention, objects such as, and most importantly, aircraft 5, missiles 6, bombs, and other types of airborne weapons, may be detected, tracked, and optionally destroyed by the system for protecting the area 14 about the location in the zone 12. For the purposes of the following description, the protected zone 12 refers to the generally hemispherical space extending above the surface of the Earth and generally centered on the location at which the system is operating, while the protected area 14 refers to describes the generally circular part of the surface of the Earth that lies below the protected zone and is generally centered on the location of the system.

The system 10 includes a support that is preferably positioned at a location substantially central to the area 14 to be protected. In one embodiment of the invention, the support 20 has a convex outer extent 22. The convex outer extent 22 is most preferably hemispherical in shape, although relatively flatter or less curved convex outer extent shapes may be used. In a preferred embodiment of the invention, the outer extent of the support comprises a generally continuous surface 16, and may thus comprise a hemispherical dome structure. Optionally, the support may be fixed in position, or could be made relatively mobile for moving between locations. Ideally, the structure of the support is formed from a relatively strong, heat-resistant material, such as a carbon composite material or a durable ceramic material. As a further option, substantially the entire structure (including the laser transmitters described below), could be enveloped in a rugged armoring material to protect the system from damage, and the armoring material may form the outer extent of the support. Small portals may be formed in the protecting material to allow free passage of the laser beams outwardly from the support.

The interior of the support structure may be substantially open or hollow to accommodate the laser transmitters and electronics for operating the laser transmitters. Other components of the lidar system of the invention may be located outside of the structure of the support to protect the components from heat and radiation generated by the laser transmitters, as well for permitting easier maintenance and replacement of the components.

The system 10 also includes a plurality of laser transmitters 30 that are mounted on the support of the system. Each of the laser transmitters is adapted to transmit, or emit, a coherent beam 32 of laser light along an axis, with each of the laser transmitters belonging to a set of transmitters of a specific angle. There would be at least two, and possibly more, sets of differently angled transmitters. Preferably, all of the laser transmitters transmit the coherent beams simultaneously, or substantially simultaneously, into the protected zone have beams passing through at the same time. The plurality of laser transmitters are preferably oriented such that the axes of the coherent beams of light emitted from the laser transmitters generally radiate outwardly from positions in or below the support to generate a grid of laser beams in the atmosphere.

The plurality of laser transmitters 30 is preferably positioned in an array 34 of transmitters on the convex outer extent of the domed support. Preferably, the array of transmitters is substantially coextensive with the outer extent 22 and is arranged in a substantially uniform density of transmitters covering the outer extent for creating a halo 36 of laser beams about the support. In one preferred embodiment of the invention, a plurality of openings 24, or holes, may be formed in the surface of the dome structure for passing the laser beams through the dome structure without impedance. In one embodiment of the invention, the plurality of laser transmitters are positioned in a plurality of rows 38 extending from a top center of the outer extent of the dome support, although more randomly positioned configurations may be employed.

The plurality of laser transmitters may be arranged in sets 40 of more than one laser transmitter, and each of the sets of laser transmitters may be provided with a substantially equal number of laser transmitters. The number of laser transmitters may range from as low as two laser transmitters per set to as high as three hundred (or more) lasers per set. In the most preferred embodiment of the invention, each of the laser transmitters of each of the sets 40 projects a laser beam 32 that is oriented at an angle with respect to a normal axis 42. (The normal axis is oriented substantially perpendicular to a plane oriented tangent to the convex outer extent of the dome support at the point that the laser beam projects through the dome.) Also preferably, each of the laser transmitters of a set is oriented in a manner such that the laser beams emitted from the laser transmitters have substantially parallel paths extending into the protected zone.

Each set 40 of the laser transmitters preferably projects laser beams oriented at an angle that is different from the angle of laser beams of other sets of laser transmitters. Illustratively, the laser transmitters of one set may project laser beams at an angle of approximately 15 degrees from the normal axis, while the laser transmitters of another set may project laser beams at an angle of approximately 10 degrees with respect to the normal axis. Thus, although the sets of laser transmitters may be arranged in rows and columns, the beams emitted from the sets of laser transmitters may form a grid as they extend away from the dome support.

The skewing of the beams in a set, and between the sets, tends to reduce the size and uniformity of the space between beams in the zone 12 so that the spaces are less likely to become so large and uniform such that airborne objects may easily maneuver through and pass between the beams, especially as compared to a system where the axis of all, or substantially all, laser beams extend through a single point below the dome support. One benefit of aiming the sets of transmitters at different angles is to create a grid of laser beams in the protected zone to a degree such that aircraft attempting to maneuver through the zone cannot avoid detection, and to reduce the possibility that aircraft or missiles could fly between the paths of the laser beams in the zone. Some intersecting of beams may be inevitable as the beams progress outwardly from the support at the various angles. Each quadrant within the grid would have predictable dimensions, allowing easy tracking of objects moving through the grid. Although the amount of interference caused by intersecting laser beams is minimal, intersection of the path of each laser beam with the paths of other laser beams should be avoided as much as possible. If a sufficient number of laser transmitters are employed, and a variety of angles are used, any gaps between paths of the beams in the zone should be too small or irregular to allow airborne objects to fly between the beams. None of the laser beams should aim directly, or close to directly, upward to avoid getting hit by laser guided weapons that might follow the laser beams of the system to the location of the support.

The number of lasers mounted on the dome support structure may vary. It is believed that using less than approximately 100 laser transmitters would in many cases provide inadequate protection for a substantially hemispherically-shaped zone. The greater the number of laser transmitters that can be arrayed on the dome, the tighter the array of coherent laser beams, and the relatively better the protection provided by the lidar system against airborne objects moving through the protected zone undetected.

The actual paths followed by the laser beams may descend only slightly downward from the line defined by the path proximate to the support, and the paths of the lasers directed in a substantially horizontal direction (see FIG. 4) may be the most affected by this phenomena. For high-energy lasers whose beams may extend for possibly hundreds of miles in some cases, the angle of descent may be no more than approximately 1 percent. For relatively lower energy lasers, the angle of descent may be as much as 5 percent. One beneficial effect of the paths of the more horizontally-oriented laser beams descending slightly downward is that the descended laser beams tend to close the periphery of the zone over the protected area, thus reducing the possibility of relatively low-flying aircraft being able to avoid detection by flying under the periphery of the protected zone created by the laser beams.

Optionally, the coherent beams of laser light generated by the laser transmitters may be provided with sufficient energy to destroy objects crossing the path of a coherent beam of light (or more than one beam) within a predetermined distance from the laser transmitter. In this way, the system not only detects and tracks airborne objects, but also has the capability to destroy objects that threaten the protected area. The laser transmitter may generate a high-energy coherent laser beam having, for example, an energy level of at least approximately 100 kilowatts. One preferable high-energy laser is a chemical-based laser of sufficient intensity. High-energy lasers typically employ gaseous material to create the coherent laser beam. Low energy lasers normally employ solid materials to generate the coherent laser beam.

For the purposes of the lidar system of the invention, a high-power, short wavelength laser is preferable. Also, a rapidly pulsed laser is also preferable as compared to a relatively more continuously projected laser beam.

With the aid of high precision optical systems, high-energy lasers can deposit intense amounts of infrared energy on targets at distances ranging from tens to hundreds of miles. The intense energy and the speed of light characteristics make lasers attractive for defending against strategic and theater ballistic missiles, short-range rockets, stealth-type aircraft, and conventional aircraft and laser-guided weapons, among other threatening air borne objects.

The laser transmitters of the invention preferably employ high-intensity or high-energy lasers of 100 kilowatts or more. The laser transmitters may less preferably employ low-energy lasers operating with power as low as 5 Watts, although such systems may be limited in their effective range. High energy is a relative term, and depends upon the amount of energy used for comparable systems. The high-intensity or high-energy lasers should be used in the laser transmitters of the invention only to the extent that they can be operated without damaging other systems of the invention, such as, for example, burning out optical telescopes or photomultiplier tubes of the laser receivers. Also, the high-energy lasers may be employed as long as undue risks to safety, health or the environment of the protected area are not created. Otherwise, relatively lower energy lasers should be used. When the system is deployed, it is contemplated that the power of the laser transmitters may be adjusted to levels where the undesirable effects are minimized to a tolerable level. Optionally, the power level of the lasers of the laser transmitters may be adjusted or varied during operation of the system based on environmental factors.

Because those coherent beams that are oriented relatively parallel to a tangent to the Earth's surface at the location of the dome support could strike the ground or objects on the ground (such as building or even persons), the lowermost laser transmitters could optionally be lower energy lasers. If, however, the risk that the lasers create to people or structures on the ground is at an acceptable level, the lowermost lasers could also be of a higher intensity or power to make the lowermost lasers more effective against aircraft, missiles and laser-guided bombs. Additional safety precautions could include use of laser safety products, such as laser eyewear, that is commercially available from manufacturers, such as Rockwell Laser Industries and others.

The laser transmitters whose coherent beams are unlikely to strike ground objects, however, could employ high-energy lasers to create the best protection. Where elaborate safety precautions might not be possible, low energy laser transmitters could be used for forming the entire array of beams. The low energy laser transmitters would still provide the benefit of detecting and tracking stealth-type aircraft, and possibly knocking laser-guided bombs off of their intended targets.

The manner for mounting the laser transmitters on the dome support could be any suitable manner, such as, for example, by fastening the laser transmitters to the support by bolts or by welding.

The system also includes a plurality of laser receivers. Each of the laser receivers may comprise a telescope for detecting back-scattered light from the laser beams transmitted from the laser transmitters of the system. The telescopes of the laser receivers preferably may comprise, for example, optical telescopes.

The system includes processing means for processing information from the laser transmitters and laser receivers, and for comparing the information from the transmitters and receivers such that airborne objects may be detected and tracked as the objects reflect (or otherwise backscatter) light from the transmitters toward the receivers. The system of the invention preferably also includes an optical table, a scanner, and data acquisition and system control circuitry. Subsystems of the data acquisition and system control circuitry may include a computer, data recorder, real-time displays and a signal processor. Programming developed for systems such as that used in the MACAWS experiments could be used, but the system would need to be adapted to coordinate inputs from multiple laser transmitters emitting substantially simultaneously, rather than the sequential firing of the lasers performed in the MACAWS experiments.

The processing means may also comprise storage means for storing information about the airborne objects detected.

The system also preferably includes controlling means for controlling the laser transmitters and laser receivers, and may comprise a programmable computer. The programmable computer of the lidar system of the invention would provide information such as the distance to the targeted object, the speed of the targeted object, the trajectory of the targeted object and, optionally the size and shape of the targeted object.

The speed of a targeted object could be tracked in different and redundant ways. As the targeted object crosses different beams of known distance from each other and from the dome, the time it takes the target to move from one beam to the next could indicate its speed. An algorithm to determine the speed may be structured around the relationship of velocity equals distance divided by time.

Another way of calculating object speed is by using the Doppler shift principle. The shift in frequency, or intensity, of the back-scattered light can determine speed. The Doppler shift principle typically already is used in commercial lidar applications to determine the speed of moving objects.

Similar principles may be used to determine the trajectory of the targeted object. As the object passes through coherent laser beams of the array formed by the laser transmitters, the backscattering of the light may be sensed by the telescopes of the laser receivers and the trajectory of the movement of the object can be calculated by the associated computers. Doppler shift principles also could be used to determine whether the object is approaching or moving away from the location of the dome support, as well as the location of the object.

To minimize confusion of the laser receivers and control systems as to which laser transmitter is the source of the coherent laser beam from which the back scattered light originated, the coherent beam pulse of all or substantially all of the laser transmitters may be synchronized for simultaneous emission. A typical pulse rate for commercial lidar systems is approximately 20 times per second. However, higher intensity lasers may be pulsed at a faster rate, which would provide more information about the position, trajectory and speed of a targeted object, which is especially desirable when the object is a relatively fast moving aircraft or missile.

To minimize signal noise from other terrestrial light sources, the laser receivers may be programmed to detect only light at the specific frequency of the coherent laser beam emitted by the laser transmitters on the lidar dome system. If more than one lidar dome system is used in the same proximity, each of the lidar dome systems may use lasers operating at different frequencies to make certain each system only detects back-scattered light radiated by that system.

The lidar dome system of the invention effectively creates a net of lasers extending in each direction from the dome support, from one horizon to the other, and thus the invention can provide protection from airborne objects such as aircraft, missiles and bombs. Even water borne objects such as ships and land-based objects, such as vehicles.

The system of the invention is also highly effective against air borne objects employing stealth technology. Stealth technology refers to materials and techniques used in the construction of mobile military systems, such as aircraft, tanks and ships, to significantly reduce their detection by conventional radar. Stealth technology also substitutes radar-opaque composite materials—such as graphite-epoxy—for metals and have an overall coating of radar-absorbing material on the structure and skin. By using several flat surfaces (instead of a single smooth surface) with sharp angles, stealth-type aircraft scatter radar energy in all directions, rather than back to the radar that sent them.

However, objects employing stealth-type technology would not be able to avoid detection by the lidar dome system of the invention. A typical modern long-range surveillance radar for early warning of the approach of aircraft might have a wavelength of 10 inches. Few have wavelengths of less than one inch. Visible light, however, has much smaller wavelengths, from 390 nanometers to 750 nanometers. Ultraviolet wavelengths can be as small as one nanometer. Infrared wavelengths are in the range of about 1,000 nanometers to 1 millimeter.

Regardless of the shape, a stealth-type aircraft or other object could not effectively scatter electromagnetic energy of the small wavelengths of the light emitted by the lidar dome system, and the laser receiver can still pick up the reflected or back-scattered signatures of stealth-type aircraft. In addition, the graphite-epoxy and other radar absorbing materials employed on stealth-type vehicles are designed specifically to absorb radio waves, not waves of visible light frequencies.

Further, if the system employs relatively high-energy laser transmitters, destruction of the airborne object may be effected by the lidar system of the invention. As the airborne object moves through the array of coherent laser beams, the object would cross multiple laser beams, which would have the same effect as one laser targeted directly at an object for a longer period of time.

Even if the lasers employed in the lidar system of the invention were of inadequate energy to destroy objects moving through the air, laser emissions of relatively lower energy laser transmitters may make an aircraft unmaneuverable by a pilot temporarily blinded by the laser emissions.

The system of the invention may also provide protection against use of laser-guided bombs and missiles by confusing the guidance systems. Laser-guided weapons are guided to the target by a targeting laser beam originating from an aircraft or on the ground and aimed at the intended target. Sensors on the missile or bomb are designed to detect the backscatter reflection of the targeting laser's light beam. A guidance computer on the missile or bomb adjusts the flight path, such as by using movable fins to steer.

The lidar system of the invention, however, would cast an array of lasers over an area that could be as much as several hundred miles in diameter. Because the guidance system of the missiles and bombs are programmed to steer toward the back-scattered light, the missiles and bombs would likely be guided toward any one of many objects causing back-scattering of the coherent light beams produced by the lidar system of the invention. Possible unintended targets to which the bombs and missiles could be diverted by the system would include clouds, hillsides or mountainsides, birds in the air, treetops, other aircraft and even the aircraft that launched the bomb or missile. To ensure that all the laser-guided bombs and missiles get misdirected, one or more of the coherent laser beams could be intentionally aimed at relatively harmless targets, such as, for example, uninhabited areas of hillsides.

In addition, if high-intensity lasers are used, the bombs or missiles may be destroyed in the atmosphere prior to the bomb or missile striking the intended target.

The lidar dome may also be effective against so-called cruise missiles that are low-flying missiles that may fly in irregular trajectories underneath conventional radar observation. Because laser transmitters of the system of the invention may be aimed substantially level with the horizon (and even slightly downward if desired) to create a canopy of protection over a site, it is highly likely that the cruise missiles could be detected, tracked and destroyed or confused by the system prior to reaching the intended target. The detection and tracking would come from the aforementioned backscattered light created by the missile as it enters the periphery of the system. If high-energy lasers are employed at the lowermost positions closest to the horizontal, the coherent laser beam emissions of the system could destroy or knock down the missile before it reaches the intended target. Alternatively, if low energy lasers are used, a more conventional anti-missile system, such as the Phalanx system, could destroy cruise missiles located and tracked by the system of the invention.

In the one embodiment of the invention, the support of the system may be placed on a raised platform, or tower, located in the midst of an area where protection is desired, such as in a city or on a military base, to create a canopy over the area.

Optionally, in another embodiment of the invention, the system, or a plurality of the systems, could be located on relatively higher terrain features, such as hillsides or mountaintops, that are located near cities, military bases or other areas to be protected. Because the periphery of the system may extend from tens to hundreds of miles, depending on the power of the laser transmitters, relatively expansive areas such as large cities or other sites may be protected.

Figure 6:
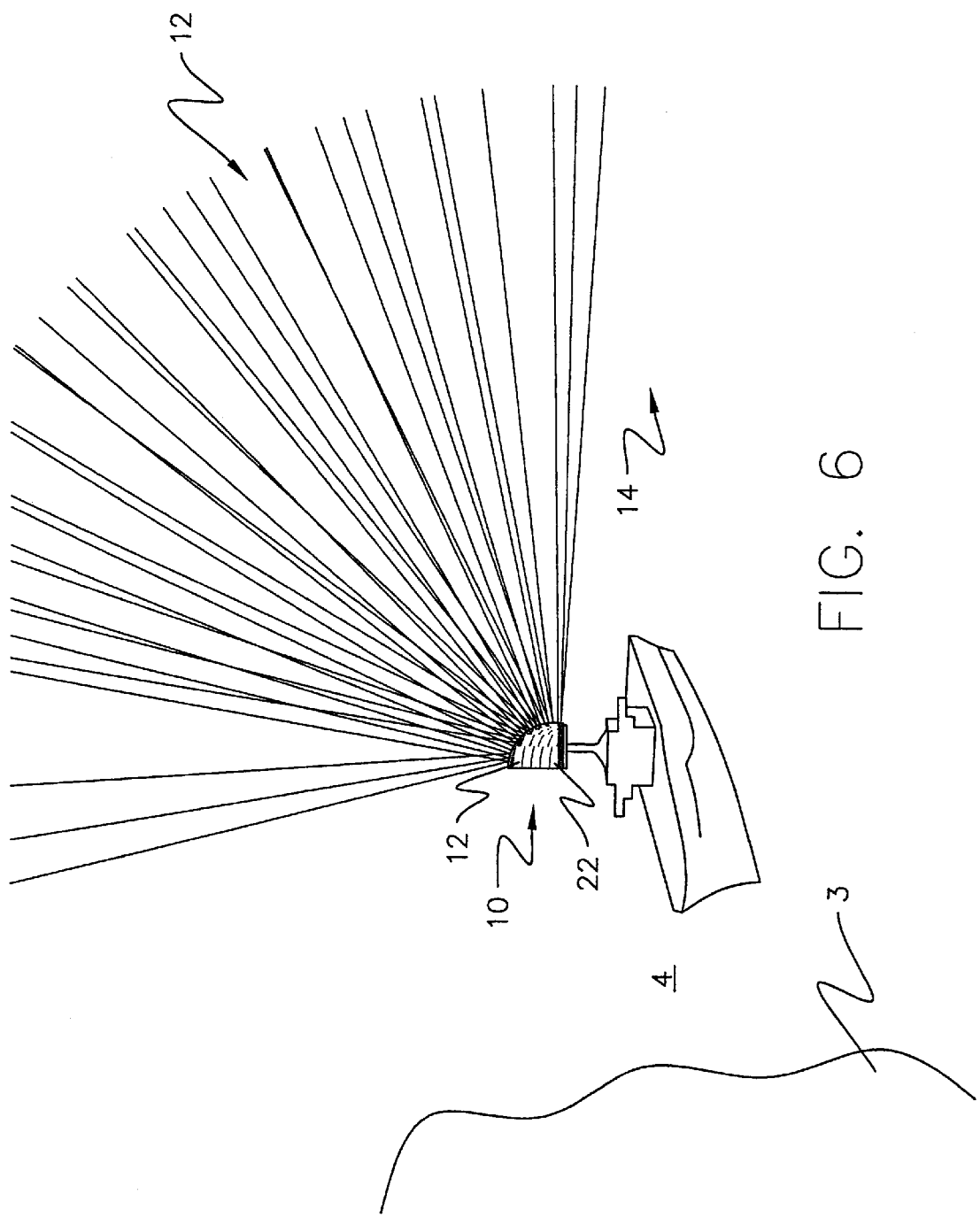
FIG. 6 is a schematic side view of the system mounted on a ship on a body of water.

Optionally, in yet another embodiment of the invention, the system could be positioned on a ship or barge on a body of water, such as off the coast of areas that need to be protected (see FIG. 6). Rather than using a system of the invention with a hemispherical periphery, the system may be modified to cover a fraction of a hemispherical space, such as half of the hemispherical area, and it will be realized that this may be accomplished by "turning off" a portion of the laser transmitters on the dome. Such partial protection may be employed, for example, adjacent to a coastal area.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A system for detecting an object moving through a space in the atmosphere, comprising:

a support;

a plurality of laser transmitters mounted on the support, each of the laser transmitters being adapted to transmit a coherent beam of light along an axis, the plurality of laser transmitters being oriented such that the axes of the beams of light emitted from the laser transmitters radiate outwardly from the support to generate a grid of beams of light in the atmosphere;

a plurality of laser receivers; and processing means for processing information from the laser transmitters and laser receivers;

wherein the plurality of laser transmitters are grouped into at least two sets, each of said sets comprising at least two laser transmitters, each laser transmitter of each of the sets transmitting a coherent beam of light along a path oriented substantially parallel to paths of other coherent beams of light transmitted by other laser transmitters of the set; and wherein the paths of the coherent beams of light produced by the laser transmitters of a first one of the sets is oriented at a first angle with respect to a normal axis, and wherein the paths of the coherent beams of light produced by the laser transmitters of a second one of the sets is oriented at a second angle with respect to the normal axis, the first and second angles being different.

2. The system of claim 1 wherein the support has a convex outer extent, the outer extent of the support having a hemispherical-shaped dome.

3. The system of claim 2 wherein the outer extent of the support comprises a surface, the surface of the support having a plurality of holes formed therein for permitting passage therethrough of coherent laser beams of the laser transmitters.

4. The system of claim 2 wherein the plurality of laser transmitters is positioned in an array substantially covering the convex outer extent of the domed support.

5. The system of claim 1 wherein the plurality of laser transmitters are positioned in a plurality of rows.

6. The system of claim 1 wherein the normal axis is oriented substantially perpendicular to a plane oriented tangent to a convex outer extent of a substantially hemispherically-shaped domed support.

7. The system of claim 1 wherein each of the sets has a substantially equal number of laser transmitters.

8. The system of claim 1 wherein there are substantially equal numbers of laser transmitters oriented at each of the angles.

9. The system of claim 1 wherein each set of laser transmitters includes laser transmitters positioned at separated locations on the support.

10. The system of claim 1 wherein the array of laser transmitters includes lower energy lasers.

11. The system of claim 10 wherein the coherent beams of light generated by the high energy laser transmitters have sufficient energy to destroy objects struck by the coherent beam of light within a predetermined distance from the laser transmitter.

12. The system of claim 10 wherein the high-energy laser generates a laser beam having energy of at least approximately 100 kilowatts.

13. The system of claim 1 wherein each of the laser receivers comprises a telescope.

14. The system of claim 13 wherein the telescope comprises an optical telescope.

15. The system of claim 1 wherein the processing means comprises storage means for storing information.

16. The system of claim 1 additionally comprising controlling means for controlling the laser transmitters and laser receivers.

17. The system of claim 1 wherein the axis of each of the laser transmitters intersects the axis of at least one other of the plurality of laser transmitters for producing a grid of intersecting coherent beams of light by the light transmitters.

18. The system of claim 1 wherein the axis of the first one of the laser transmitters intersects the axes of at least two other laser transmitters of the plurality of laser transmitters for producing a grid of intersecting coherent beams of light by the light transmitters.

19. A system for detecting an object moving through a space in the atmosphere, comprising:

a support;

a plurality of laser transmitters mounted on the support, each of the laser transmitters being adapted to transmit a coherent beam of light along an axis, the plurality of laser transmitters being oriented such that the axes of the beams of light emitted from the laser transmitters radiate outwardly from the support;

a plurality of laser receivers; and processing means for processing information from the laser transmitters and laser receivers;

wherein the plurality of laser transmitters are grouped into at least two sets, each of said sets comprising at least two laser transmitters, each laser transmitter of each of the sets transmitting a coherent beam of light along a path oriented substantially parallel to paths of other coherent beams of light transmitted by other laser transmitters of the set;

wherein the paths of the coherent beams of light produced by the laser transmitters of a first one of the sets is oriented at a first angle with respect to a normal axis, and wherein the paths of the coherent beams of light produced by the laser transmitters of a second one of the sets is oriented at a second angle with respect to the normal axis, the first and second angles being different;

wherein the support has a convex outer extent, the outer extent of the support having a hemispherical-shaped dome;

wherein the outer extent of the support comprises a surface, the surface of the support having a plurality of holes formed therein for permitting passage therethrough of coherent laser beams of the laser transmitters;

wherein the plurality of laser transmitters is positioned in an array substantially covering the convex outer extent of the domed support;

wherein the plurality of laser transmitters are positioned in a plurality of rows;

wherein the plurality of laser transmitters are arranged in sets;

wherein each of the laser transmitters of each of the sets is oriented at an angle with respect to a normal axis, the normal axis being oriented substantially perpendicular to a plane oriented tangent to a convex outer extent of a substantially hemispherically-shaped domed support;

wherein each set of the laser transmitters is oriented at a different angle with respect to the normal axis and other sets;

wherein each of the sets has a substantially equal number of laser transmitters;

wherein there are substantially equal numbers of laser transmitters oriented at each of the angles;

wherein each set of laser transmitters includes laser transmitters positioned at locations about the circumference of the dome;

wherein the high energy laser generates a laser beam having energy of at least approximately 100 kilowatts;

wherein each of the laser receivers comprises a telescope;

wherein the telescope comprises an optical telescope;

wherein the processing means comprises storage means for storing information; and controlling means for controlling the laser transmitters and laser receivers.

* * * * *